(12) United States Patent
Cisar

(10) Patent No.: US 7,234,912 B2
(45) Date of Patent: Jun. 26, 2007

(54) DEVICE FOR THE TRANSPORT OF WORK PIECES

(75) Inventor: Rolf Cisar, Engelthal (DE)

(73) Assignee: Schuler Automation GmbH & Co. KG, Hessforf (DE)

( * ) Notice: Subject to any disclaimer, the term of this patent is extended or adjusted under 35 U.S.C. 154(b) by 93 days.

(21) Appl. No.: 10/953,941

(22) Filed: Sep. 29, 2004

(65) Prior Publication Data

US 2005/0074320 A1 Apr. 7, 2005

Related U.S. Application Data

(60) Provisional application No. 60/537,223, filed on Jan. 16, 2004.

(30) Foreign Application Priority Data

Oct. 1, 2003 (DE) ............... 103 45 685

(51) Int. Cl.
*B65G 65/00* (2006.01)

(52) U.S. Cl. ............... 414/751.1; 198/468.6; 414/749.1; 414/917

(58) Field of Classification Search ............ 414/749.1, 414/751.1, 752.1, 753.1, 917; 198/468.6, 198/468.4, 468.5

See application file for complete search history.

(56) References Cited

U.S. PATENT DOCUMENTS

| 3,590,986 A | 7/1971 | Andrews et al. |
| 5,520,502 A * | 5/1996 | Liljengren et al. ....... 414/751.1 |
| 5,975,284 A | 11/1999 | Kato |

FOREIGN PATENT DOCUMENTS

| DE | 2847273 | 5/1980 |
| DE | 2852929 | 6/1980 |
| DE | 253797 | 2/1988 |
| DE | 19819277 | 11/1999 |
| EP | 0633077 | 1/1995 |
| SU | 977087 | 11/1982 |

\* cited by examiner

*Primary Examiner*—Donald Underwood
(74) *Attorney, Agent, or Firm*—Rankin, Hill, Porter & Clark LLP

(57) ABSTRACT

The invention relates to a device for the transport of work pieces with at least one transport device (T1, T2) which can be installed on a frame (14) of a processing device (P) and which has a transport bar (15) which is kept moveable in X- and Y-direction. To increase the rigidity of the device, it is suggested that the transport bar (15) be kept moveable with at least two parallelogram servo drives (PL1, PL2).

15 Claims, 7 Drawing Sheets

Figure 1:
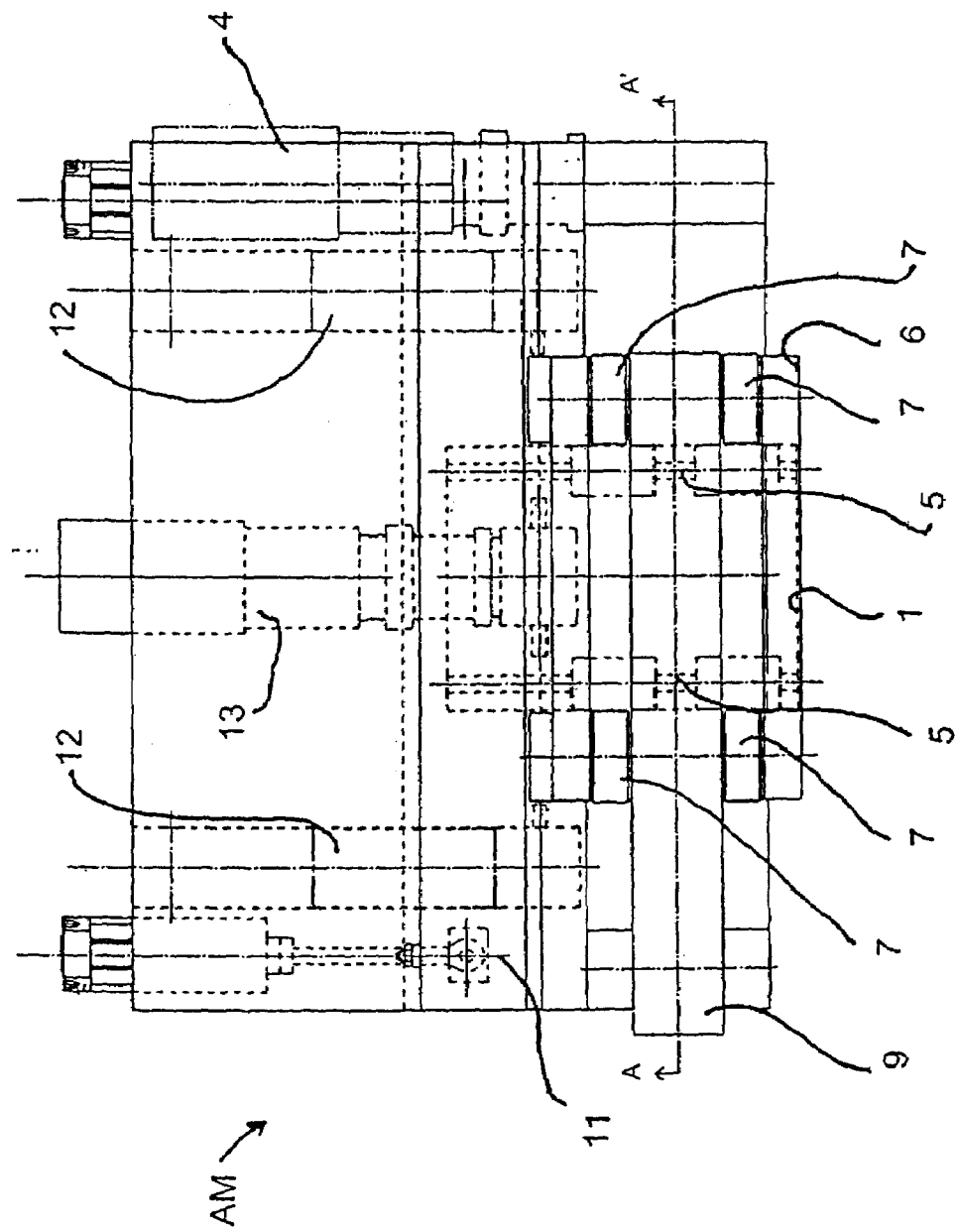

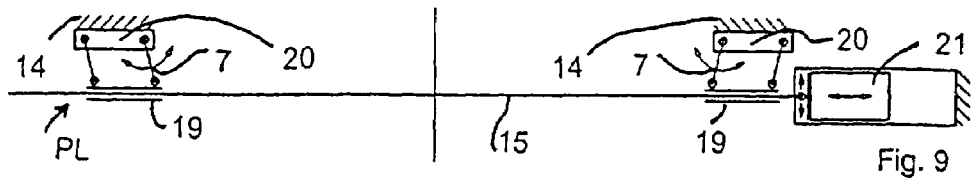
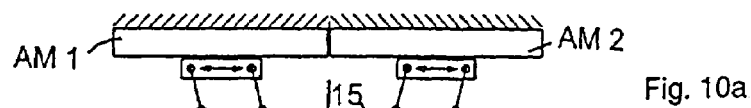
Fig. 10a
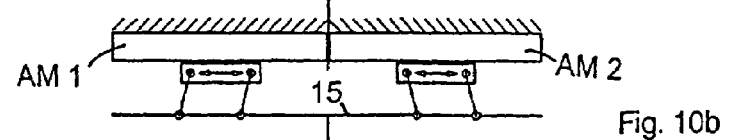
Fig. 10b
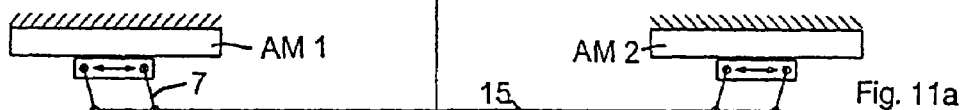
Fig. 11a
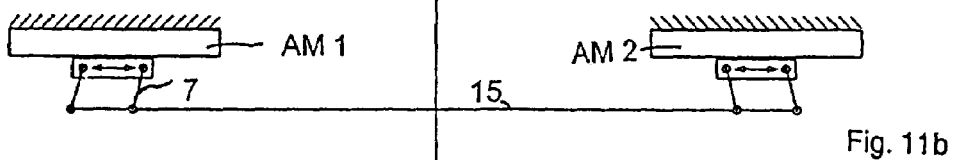
Fig. 11b
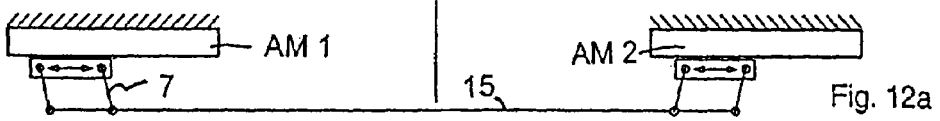
Fig. 12a
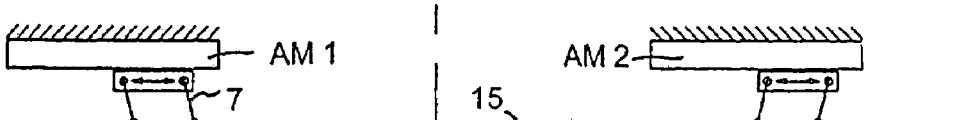
Fig. 12b
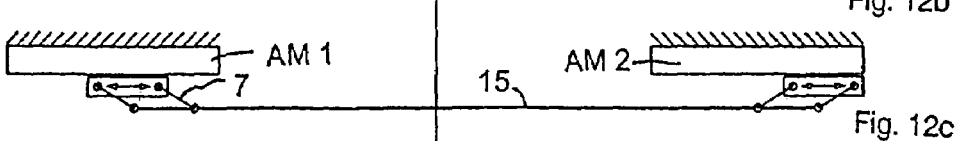
Fig. 12c
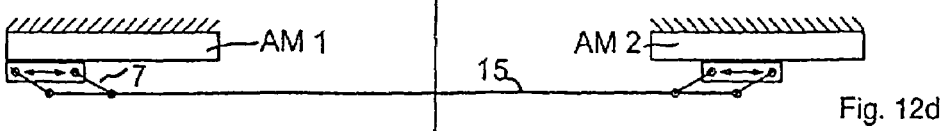
Fig. 12d

DEVICE FOR THE TRANSPORT OF WORK PIECES

The invention relates to a device for the transport of work pieces. It relates in particular to a device for the step-by-step feeding of work pieces in presses.

Such a device is known from the EP 0 633 077 A1. With this, the transport bars are held on levers. The levers are guided on their one end by sliding guides provided on the transport bars and on their other ends are held with stationary swivel bearings. The transport bars can be moved via a gripper crosshead connected thereto in the transport or X-direction and in a Y-direction running vertical thereto.— In actual practice, a jammed transport causes the transport bars to bend. This may cause undesired falling out and/or slipping through of work pieces. Provision of the gripper crossheads required to move the transport bars in the direction of transport and the related drive requires a large amount of space.

From the DE 28 52 929 C2, a feeder device is known for the step-by-step transport of work pieces in presses in which two gripper rails or transport bars along the path of transport are located in an arrangement vis-à-vis from each other. To grasp the work pieces the gripper rails are moved towards each other via a toothed gear until the work pieces are held fast by clamping. The gripper rails are then moved in the direction of transport and the work pieces are deposited at another location by moving the gripper rails away from each other. To ensure a continuously synchronous sequence of motion, the movements of the toothed gear are controlled via disk cams.—The known feeder device requires a great amount of work to manufacture it. It is not designed modularly. A new, adapted construction is required for each presss geometry.

A device for the loading of a plate press is known from the DE 28 47 273 A1. Two loading bars or transport bars located vis-à-vis from each other can be moved on carriages in the direction of transport. Each of the transport bars can be moved in one direction vertical to the direction of transport via a shear servo drive. Several gripper devices are provided on each of the transport bars. The gripper devices are equipped with terminal strip pairs which can be moved vertically against each other via parallelogram steering servo drive devices.—The known device requires a plurality of drive devices. Drive devices are required for the movement of the carriages in the direction of transport, for the movement of the transport bars vertically to the direction of transport as well as for the movement of the gripper devices.

From the U.S. Pat. No. 3,590,986 a transport device for work pieces is known having two transport bars vis-à-vis to each other which transport bars can be smoothly be moved towards each other or away from each other, respectively. For that purpose each of the transport bars is fixed at their ends with steering elements at bell cranks. By means of a movement of the bell cranks, the transport bars can be moved in Y-direction. For the movement of the transport bars in a direction of transport a separate device is provided by which the transport bars being held in parallel to the transport direction in sliding guides are moveable.

The U.S. Pat. No. 5,975,284 discloses a transport device where vis-à-vis arranged transport bars are mounted on tables moveable which are in X- and Y-direction. For the movement of the tables which are swinging arms are provided that are slidably guided in recesses of the tables. An in principle similarly designed device for the transport of work pieces is also known from the DD 253 797 A1.

The object of the invention is to remove the disadvantages of the state of the art. In particular a device for the transport of work pieces is to be specified which is simple and inexpensive to make and which permits a precise and safe way to hold the work pieces and to transport them precisely. Another goal of the invention is that the device is to be designed so that it can be adapted without great effort to different processing device geometries such as presses or similar.

According to the invention, it is provided that the transport bar is kept moveable by at least a first and a second parallelogram servo drive, wherein each of the parallelogram servo drives has a first and a second coupling element arranged vis-à-vis from each other, which are connected moveably via at least two parallel installed steering elements, and wherein the steering elements of a a first parallelogram servo drive can be swiveled in opposite direction to the steering elements of a second parallelogram servo drive in order to generate a movement of the transport bar in Y-direction.

In the sense of the invention, "X-direction" usually means the direction of transport. This can be a horizontal or a vertical direction, for example.

Since the transport bar is held via at least two parallelogram servo drives and since the steering elements of the parallelogram servo drives can be be swivled in opposite directions in order to generate a movement of the transport bar, the rigidity of the take-up of the transport bar is substantially improved. The steering elements are arranged so that the transport bar is held stable to support a deposited load. The movements of the transport bar can be carried out with high precision.

With the parallelogram servo drives the swivel bearings of the steering elements are installed stationarily on the coupling elements. With a movement of the coupling elements relative to each other, the steering elements each swivle at the same angle. An area enclosed by the steering elements and the coupling elements forms a parallelogram.

In the sense of this invention, the term "coupling element" is to be understood as a general term. It can be a rigid bar which may be connected with the transport bars or with a linear movement device. The coupling element can also be part of the transport bar or of a linear movement device.

It has proven to be advantageous when the first coupling element is installed on a linear movement device or is part of same. By installing the first coupling element on a linear movement device or having it be part of same, it is advantageously achieved that a movement of the gliding elements relative to each other alone in the X-direction can achieve a movement of the transport bar in the X- and in the Y-direction.

The first coupling element can be a first gliding element of the linear movement device. It is useful when the linear movement device is installed on the frame. This simplifies the construction of the device. In particular, drive devices can be permanently positioned on the frame.

Under the term "linear movement device" is to be understood a device with which an object is connected with a further object so that a movement of the two objects relative to each other must be along a straight line. For example, a gliding element can be provided which can be made to glide on a straight rail. However, the gliding elements can also be guided in linear sliding or rolling bearings.

In accordance with a further advantageous embodiment, the linear movement device has a second gliding element being vertically moveable to the direction of movement of the first gliding element on which second gliding element the first gliding element is installed. With the first and/or second gliding element, this can be a carriage located on a linear guide. It is useful when the first and the second gliding elements are designed like a cross carriage. This permits a movement of the transport bar in the X-, Y- and Z-direction.

In accordance with a further embodiment, at least one first drive device is provided for the movement of the first and/or second gliding element, preferably in the Z-direction. Furthermore, at least one second drive device can be provided for the movement of the first and/or second gliding element, preferably in the X-direction. A separate second drive device can also be provided for movement of each of the second gliding elements. This provides a simple way to execute a specified movement of the transport bar both in the X- and in the Y-direction with suitable control of the drive device. It is useful when the movement can be controlled with a process computer provided for control of the drive device/devices. This provides a particularly simple way to adjust the device provided by the invention to very different geometries of processing devices such as presses. It is suitable for retro-fitting of existing processing devices. To adjust to different geometries, the invention only requires that the suitable length of the transport bar be selected. The linear movement devices and the drive device/devices can remain unchanged.

It is useful when the first and/or second gliding element is connected with the first and/or the second drive device via a toothed belt. The connection can also be made with a threaded spindle, a toothed rod or similar instead of the toothed belt. The use of linear motors has been shown to be particularly advantageous. With this, for example, gliding elements which are moveable in the X-direction can be designed as primary parts which are kept glidable on a single secondary part. In this case, a single sliding guide can be used to hold several gliding elements.

In accordance with a further advantageous embodiment, the first and the second drive device are provided outside the first or the second carriage. This keeps the mass to be moved, namely the mass of the gliding element, small. The movements can be made with rapid acceleration. The work pieces can be transported particularly quickly and efficiently with the device provided by the invention.

In accordance with a further embodiment, the second coupling element is secured on the transport bar or is part of the transport bar. In accordance with an alternate embodiment, however, it is also possible that the second coupling element is installed on the transport bar and is linearly moveable. In this case, the second coupling element can be designed as a further gliding element which, for example, grasps the transport bars at least partially. Such a further gliding element can be provided with a further drive device which permits a movement of the further gliding element relative to the transport bar.

The first steering elements can be installed on a first end and/or the second steering elements can be installed on a second end of the transport bar. Due to the provision of a parallelogram servo drive as provided by the invention for the movement of the transport bar, bending of the same is also drastically reduced in this case. The installation of the steering elements on the ends of the transport bar gives the construction new flexibility.

In accordance with a further embodiment, gripper devices are provided on the transport bar to grasp the work pieces to be transported. These can be conventional active gripping elements. Such gripping elements are provided in particular when the device provided by the invention only has one transport direction.

It is advantageous when at least one sliding guide is provided to hold the first and/or second gliding element. With the gliding elements, these are particularly the gliding elements which can be moved in the X-direction. By providing a single sliding guide, it can be achieved that the gliding elements can be moved linearly in a common plane in the X-direction.

It is useful when the sliding guide/guides is/are installed on the frame of a processing device. This can be a press or similar. It is possible to install the sliding guide/guides within the frame or outside on the frame.

In accordance with a further embodiment, a further transport device with the previously described features is installed vis-à-vis from the first transport device, preferably in a mirror-image arrangement. In this case, the movements of the transport devices are advantageously controlled so that the work pieces can be clamped between the transport bars.

The provision of the suggested parallelogram steering element servo drive contributes to the drastic increase in the rigidity of the transport bar. In case two transport devices are used vis-à-vis from each other, the clamping pressure can be increased. The falling out and/or slipping through of work pieces during transport is reliably avoided. When only one transport device is used, in particular one with active gripping elements, a particularly precise and dynamic sequence of movement can be guaranteed.

Figure 2:
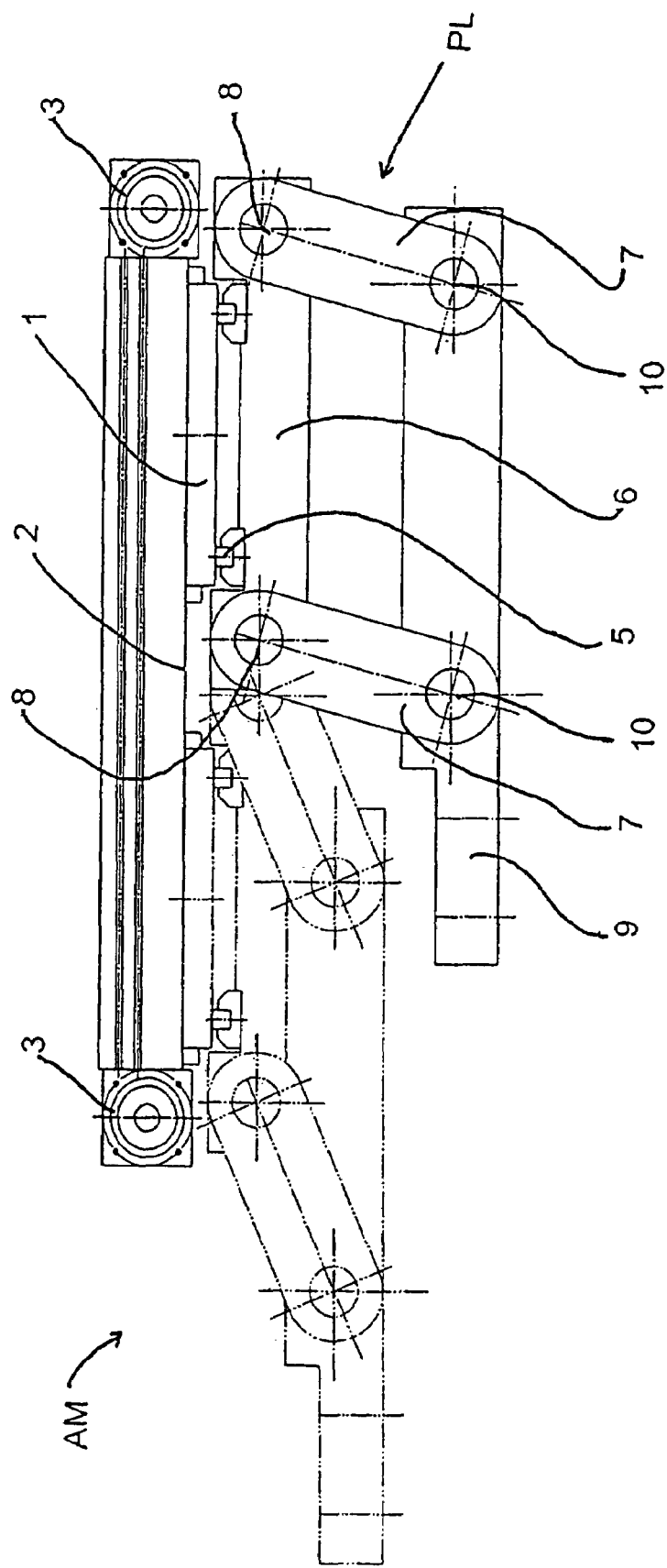
Figure 3:
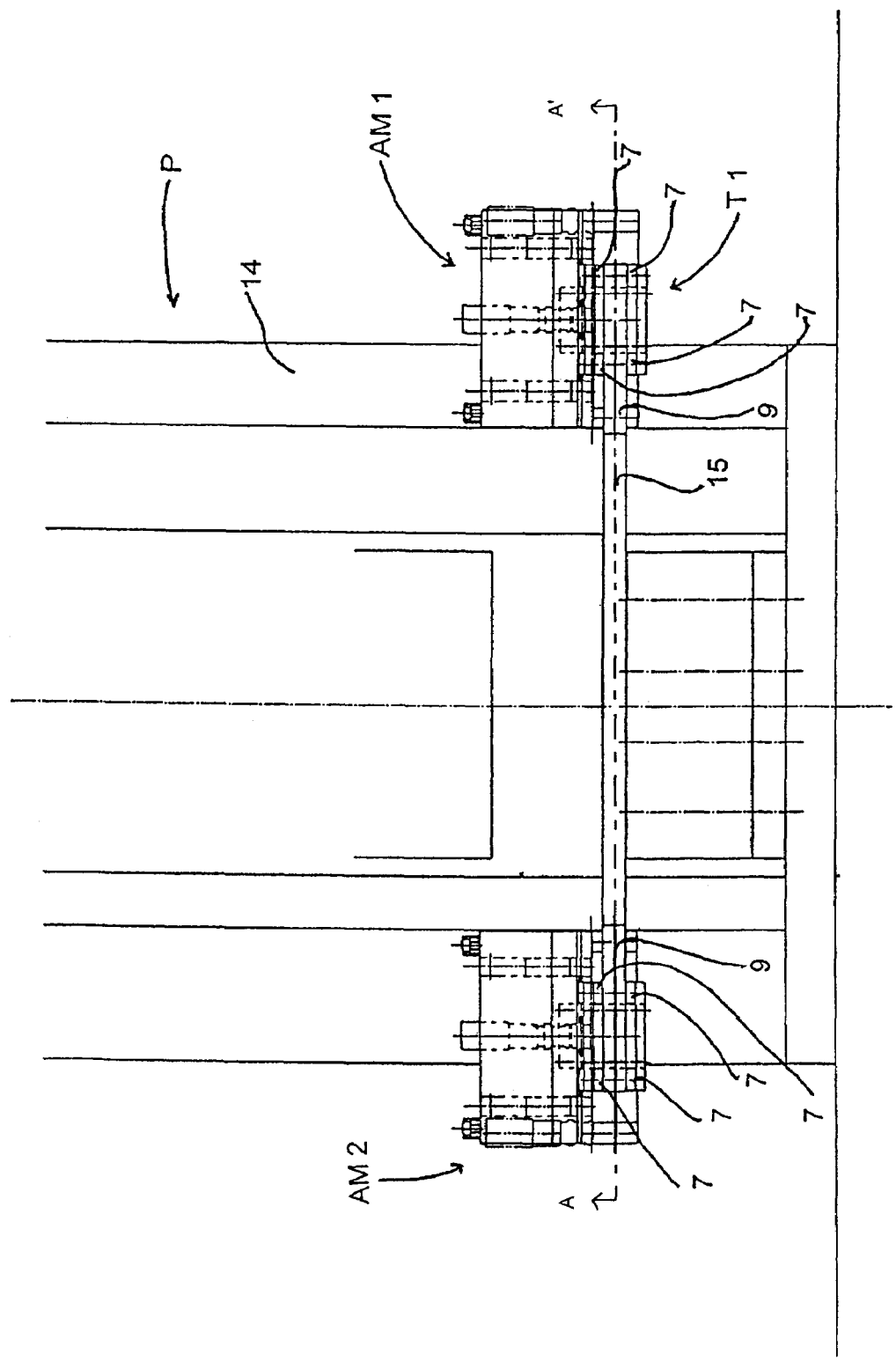
Figure 4:
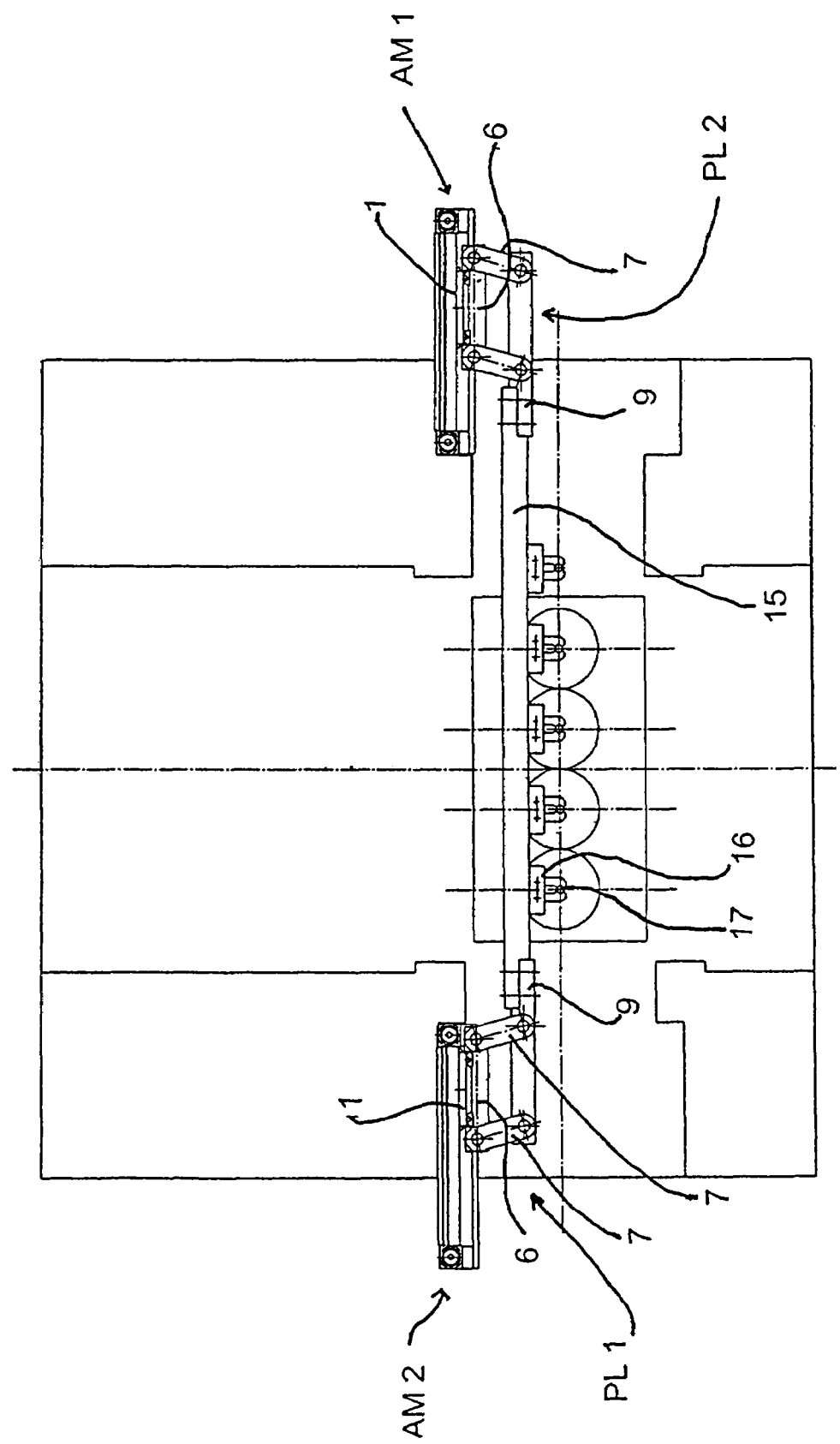
Figure 5A:
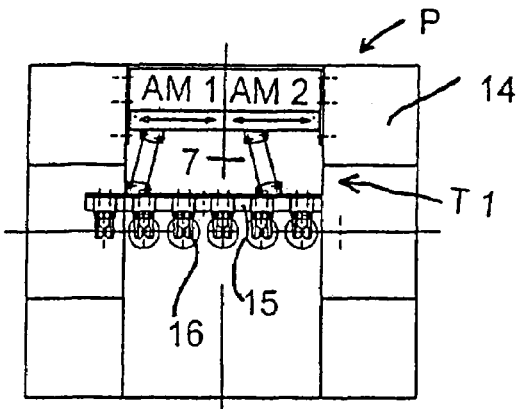
Figure 6A:
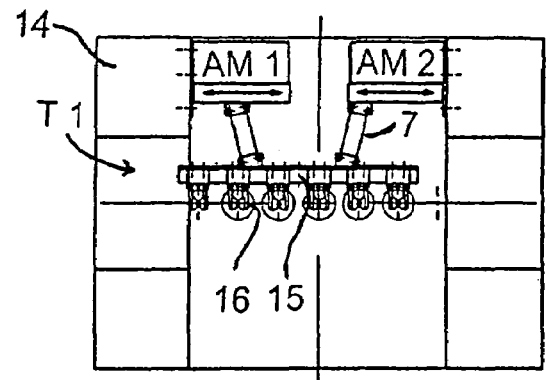
Figure 5B:
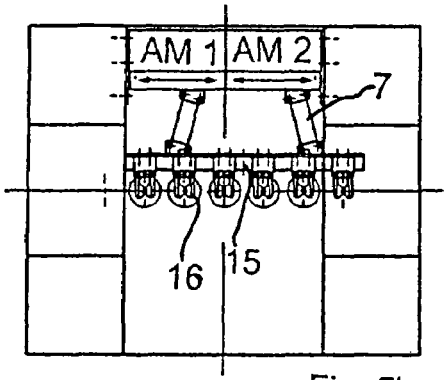
Figure 6B:
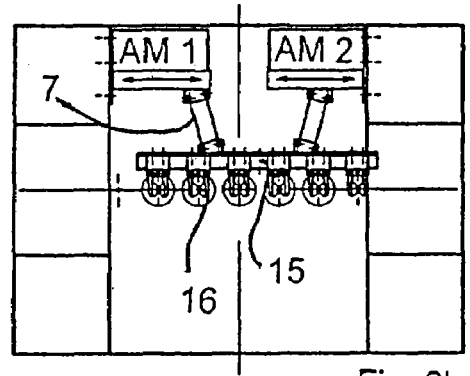
Figure 5C:
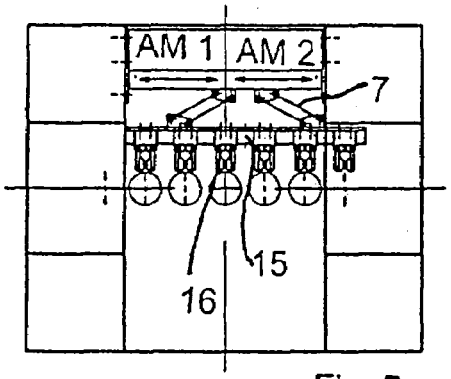
Figure 6C:
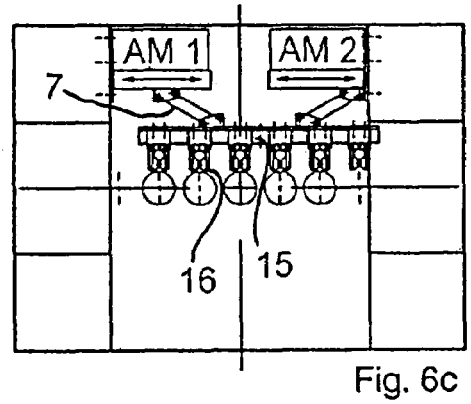
Figure 5D:
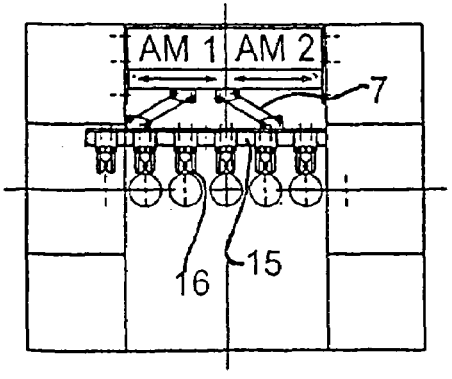
Figure 6D:
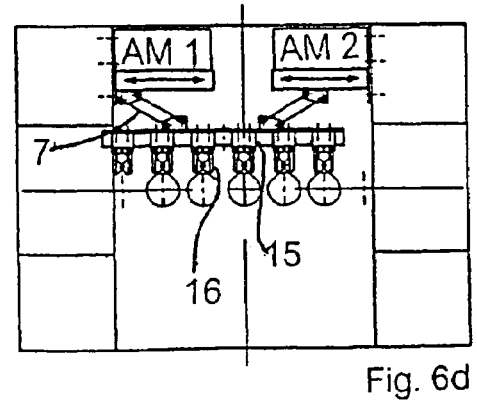
Figure 7A:
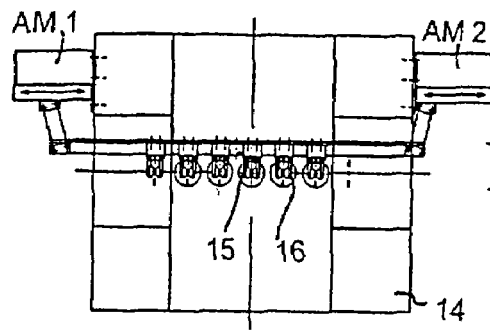
Figure 8A:
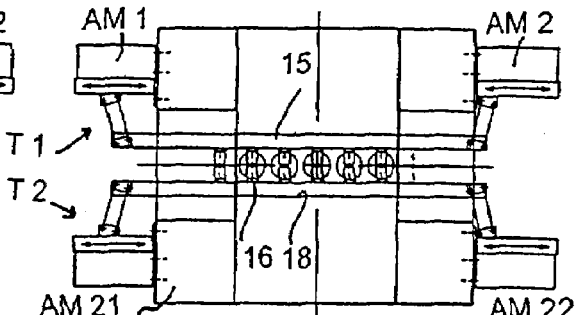
Figure 7B:
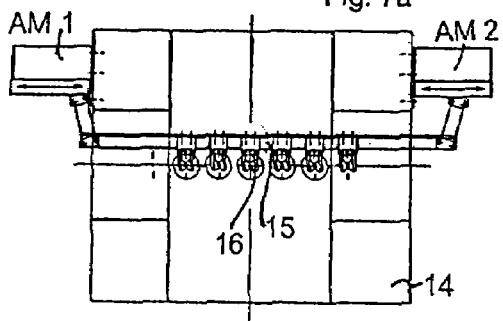
Figure 8B:
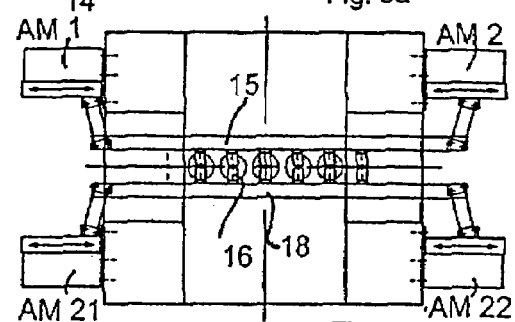
Figure 7C:
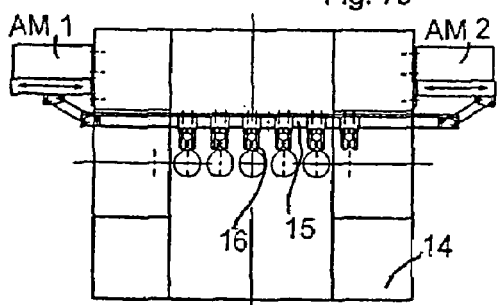
Figure 8C:
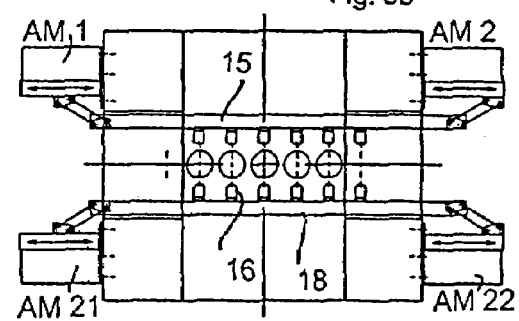
Figure 7D:
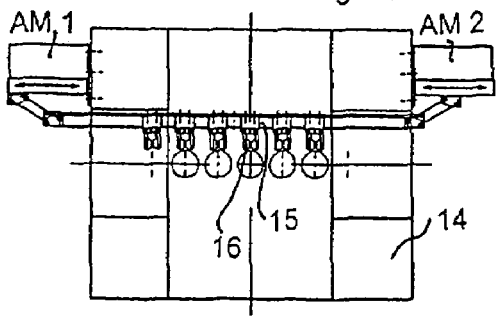
Figure 8D:
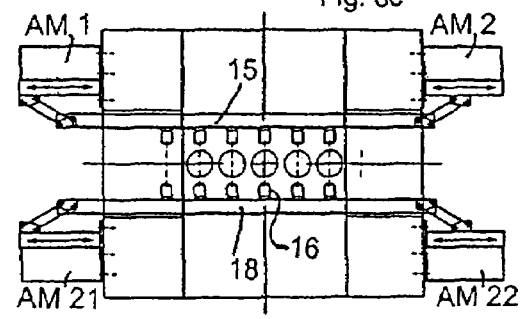

The invention will now be described in more detail using examples based on the drawing. It is shown:

FIG. 1 a side view of a drive module,

FIG. 2 a sectional view in accordance with the intersecting line A-A' in FIG. 1, FIG. 3 a side view of a press with a first device, FIG. 4 a sectional view in accordance with FIG. 3 in accordance with the intersecting line A-A', FIGS. 5a-d the sequence of movement with a second device, FIGS. 6a-d the sequence of movement with a third device, FIGS. 7a-d the sequence of movement with a fourth device, FIGS. 8a-d the sequence of movement with a fifth device, FIG. 9 a principle drawing of a sixth device, FIG. 10a a principle drawing of the arrangement of the second or third device, FIG. 10b the arrangement in accordance with FIG. 10a with an alternate position of the steering elements, FIG. 11a a principle drawing of the arrangement of the fourth device, FIG. 11b the arrangement in accordance with FIG. 11a with an alternate position of the steering elements, FIGS. 12a-d principle drawings of the sequence of movement, as shown in FIG. 7a-d.

FIGS. 1 and 2 show a drive module AM suitable for the making of a transport device as provided by the invention. A first carriage 1 is connected, for example, via a toothed belt 2 with toothed disk 3. One of the two toothed disks 3 is connected with a first electric motor 4 for drive. The first carriage 1 is located on an X-rail running in the X-direction (not shown here) which covers the distance created between the toothed disks 3. Z-rails 5 are installed on the first carriage 1 in the Z-direction on which rails a second carriage 6 is placed. The first carriage 1 and the second carriage 6 form a cross carriage 6. The steering elements 7 are positioned on their one end in the first swivel bearings 8 installed permanently on the second carriage 6. On their other end, the first steering elements 7 are held swivelable in second swivel bearings 10 installed permanently on a coupling element 9.

FIG. 2 particularly shows the carriages 1, 6, the first steering elements 7 and the coupling element 9 in two different positions. The coupling elements 9, the steering elements 7 and the second carriage 6 form a parallelogram servo drive PL. With this, the second carriage 6 handles the function of a further coupling element. It is naturally also conceivable that such a further coupling element (not shown here) is provided which is installed on the second carriage 6.

As is also shown in FIG. 1, the second carriage 6 is installed in horizontal direction glidable on a horizontal supporting bar 11. The supporting bar 11 can glide vertically in the Z-direction in Z-guides 12. A second electro motor 13 is used for the vertical movement of the supporting bar 11.

Via two of the drive modules AM shown in FIGS. 1 and 2, it is possible to move a transport bar installed on the coupling elements 9 in the X- and Y-direction for the transport of work pieces.

FIGS. 3 and 4 show a first device. This is a transport device T1 which has a first AM1 and a second drive module AM2. The drive modules AM1, AM2 correspond to the drive module AM shown in FIGS. 1 and 2. The first drive module AM1 has a first PL1 and the second drive module AM2 has a second parallelogram servo drive PL2. The drive modules AM1, AM2 are mounted on the frame 14 of a press P. The coupling elements 9 of the drive modules AM1, AM2 are connected with a transport bar 15.

As FIG. 4 illustrates in particular, several gripper devices 16 are installed on the transport bar 15. Such gripper devices 16 can be designed as active gripper elements. They are used to grasp work pieces 17 and have an own drive.

FIG. 5a to 5d show the sequence of movement with a second device for the transport of work pieces 17. With this, the drive modules AM1, AM2 are positioned within the frame 14 of the press P. Such an arrangement is particularly space-saving. Only a single transport device T1 is provided to transport the work pieces 17. Gripper devices 16 are installed on the transport bar 15 which are equipped with active gripper elements. FIG. 5a to 5d show that, with suitable movement guidance of the first carriages 1, a movement of the transport bar 15 can be executed both in the transport or X-direction and in a Y-direction vertical to the transport direction. The only requirement is suitable control of the movements of the first carriages 1 in the X-direction.

In accordance with a particularly advantageous (not shown here) embodiment, the two drive modules AM1, AM2 can be combined. For this, the first carriages 1 of the two drive modules AM1, AM2 can be placed on a common rail of a linear motor. In this case, the common rail forms a common secondary part. The two first carriages 1 form two primary parts of the linear motor. They can be moved separately from each other on the secondary part. Such an arrangement is particularly space-saving.

FIG. 6a to 6d show the sequence of movement for a third device. Also here only one single transport device T1 is provided. The drive modules AM1, AM2 are also installed here within the frame 14 of the press P. When the drive modules AM1, AM2 are installed within the frame 14 of press P, the steering elements 7 cannot be installed on the ends of the transport bar 15 but are installed staggered and more towards the middle of the transport bar 15.

FIG. 7a to 7d show the sequence of movement of a fourth device. With this, the drive modules AM1, AM2 are installed on the outside of the frame 14 of the press P. Also here the transport bar 15 is equipped with gripper devices 16. Transport of the work pieces in the transport direction is also possible here with a suitably coordinated movement of the first carriages 1 in the X-direction.

With the fifth device shown in FIG. 8a to 8d, two transport devices T1 and T2 are provided. Their drive modules AM1, AM2 or AM21, AM22 are then installed on the outside of the frame 14. The transport bar 15 and a further transport bar 18 are then located in one plane vis-à-vis from each other. The transport bars 15 or 18 are then provided here with gripper devices 16. In this case, the gripper devices 16 are designed as so-called passive gripper elements, i.e., they are designed in their form corresponding to the form of the work pieces 17 to be transported. With this, the work pieces 17 are grasped by two gripper elements which are moved towards each other with the transport bars 15, 18. FIG. 8a to 8d show the sequence of movement when two transport devices T1, T2 as provided by the invention are used. For the transport of the work pieces 17 in the X-direction, it is required here that the movements of the first carriages 1 of the drive modules AM21 and AM22 of the further transport device T2 must also be coordinated with the movements of the first carriages 1 of the drive modules AM1, AM2 of the transport device T1. The control of the movements of the first carriages 1 can be provided via program-controlled activation of the respective drive device, in particular of the electro motors.

FIG. 9 shows a sixth device as principle drawing. With this, second carriages 19 can be slid along the transport bar 15. The steering elements 7 are held swivelable here in a further coupling element 20 which is installed on frame 14. The coupling element 20 can be installed moveably in the Z-direction. The further coupling element 20, the steering elements 7 and the second carriages 19 form a parallelogram servo drive PL here. With the sixth device shown in FIG. 9, the movement of the transport bar 15 is not caused by an active movement of the second carriages 19, but by a drive device 21 located outside with which the transport bar 15 can be moved in both the X- and the Y-direction. However, it is also possible that the second carriages 19 are each equipped with drive device for movement on the transport bar 15. Undesired bending of the transport bar 15 is also substantially reduced here by its placement via the parallelogram servo drive PL provided by the invention.

FIG. 10a shows an alternate arrangement of the steering elements 7 with the second or third device. The arrangement of the steering elements 7 in accordance with the second device (see FIG. 5a to 5d) is illustrated in FIG. 10b. In a similar fashion. FIG. 11a again shows as a principle drawing the arrangement of the steering elements 7 of the fourth device. FIG. 11b shows an alternate arrangement of the steering elements 7. In each case, the steering elements 7 are arranged so that they are swiveled in opposite directions when a movement of the transport bar 15 occurs.

FIG. 12a to 12d again show the sequence of movement with the fourth device (see also FIG. 7a to 7d).

REFERENCE DESIGNATION LIST

1 First carriage
2 Toothed belt
3 Toothed disk
4 First electro motor
5 Z-rail
6 Second carriage
7 Steering element
8 First swivel bearing
9 Coupling element
10 Second swivel bearing
11 Supporting bar
12 Z-guide 13 Second electro motor
14 Frame
15 Transport bar
16 Gripper device
18 Work piece
19 Further transport bar
20 Second carriage
21 Further coupling element
22 Drive device
T1 Transport device
T2 Further transport device
AM1, AM2 Drive modules of the first transport device
AM21, AM22 Drive modules of the second transport device
P Press
PL, PL1, PL2 Parallelogram servo drive

The invention claimed is:

1. A device for transport of work pieces (17) with at least one transport device (T1, T2) which can be installed on a frame (14) of a processing device (P) and which is equipped with a transport bar (15) that is moveable in X- and Y-directions, wherein:
the transport bar (15) is kept moveable by at least a first and a second parallelogram servo drive (PL1, PL2),
wherein each of the parallelogram servo drives (PL1, PL2) has a first coupling element (6, 20) and a second coupling element (9, 19) arranged vis-à-vis from each other, which are connected moveably via at least two parallel installed steering elements (7), the second coupling element (9, 19) being secured on the transport bar (15) or being a part of the transport bar (15), and
wherein the first coupling element (6, 20) and/or second coupling element (9, 19) are moveable by a linear movement device relative to each other in the X-direction, so that for generating a movement of the transport bar (15) in the Y-direction the steering elements (7) of the first parallelogram servo drive (PL1) can be swiveled in an opposite direction to the steering elements (7) of the second parallelogram servo drive (PL2).

2. The device as defined in claim 1, wherein the first coupling element (6, 20) is installed on the linear movement device or is a part of the linear movement device.

3. The device as defined in claim 2, wherein the first coupling element (6, 20) forms a first gliding element (6) of the linear movement device.

4. The device as defined in claim 3, wherein the linear movement device has a second gliding element (1) that is moveable in an X-direction of movement with the first gliding element (6), and on which second gliding element the first gliding element (6) is installed.

5. The device as defined in claim 4, wherein at least one of the first and second gliding elements is a carriage placed on a linear guide.

6. The device as defined in claim 4, wherein the first and second gliding elements are formed like a cross carriage.

7. The device as defined in claim 4, wherein at least one first drive device (13) is provided for moving at least one of the first and second gliding elements in a Z-direction direction.

8. The device as defined in claim 7, wherein at least one second drive device (4) is provided for moving at least one of the first and second gliding elements in a X-direction direction, transverse to said Z-direction direction.

9. The device as defined in claim 8, wherein at least one of the first and second gliding elements is connected with at least one of the first and second drive devices via a tooth belt (3).

10. The device as defined in claim 1, wherein the second coupling element (19) is installed on the transport bar (15) and is slidingly moveable in the X-direction relative to the transport bar (15) when the second coupling element (19) is moved by the linear movement device and wherein the transport bar (15) is movable by a drive device (21).

11. The device as defined in claim 1, wherein gripper devices (16) for grasping the work pieces (17) to be transported (17) are provided on the transport bar (15).

12. The device as defined in claim 4, wherein at least one sliding guide is provided to hold at least one of the first and second gliding elements.

13. The device as defined in claim 12, wherein the at least one sliding guide is installed on the frame (14) of the processing device (P).

14. The device according to claim 12, wherein the at least one sliding guide is installed within the frame (14) or outside on the frame (14) of the processing device.

15. The device as defined in claim 1, comprising first and second transport devices, and wherein the first and second transport devices are respectively installed in a mirror-image arrangement.

* * * * *

UNITED STATES PATENT AND TRADEMARK OFFICE
CERTIFICATE OF CORRECTION

PATENT NO. : 7,234,912 B2
APPLICATION NO. : 10/953941
DATED : June 26, 2007
INVENTOR(S) : Cisar It is certified that error appears in the above-identified patent and that said Letters Patent is hereby corrected as shown below:

On the Title Page, Section [73], Assignee, Line 2, delete "Hessforf" and insert --Hessdorf--.

Signed and Sealed this

Twenty-seventh Day of November, 2007

JON W. DUDAS
*Director of the United States Patent and Trademark Office*